(12) United States Patent
Belligundu

(10) Patent No.: US 12,546,530 B2
(45) Date of Patent: Feb. 10, 2026

(54) DISPENSING SYSTEM WITH TEMPERATURE CONTROLLED DRAWERS

(71) Applicant: Omnicell, Inc., Mountain View, CA (US)

(72) Inventor: Sunil Belligundu, Campbell, CA (US)

(73) Assignee: Omnicell, Inc., Cranberry Township, PA (US)

( * ) Notice: Subject to any disclaimer, the term of this patent is extended or adjusted under 35 U.S.C. 154(b) by 0 days.

(21) Appl. No.: 18/330,992

(22) Filed: Jun. 7, 2023

(65) Prior Publication Data

US 2023/0314068 A1 Oct. 5, 2023

Related U.S. Application Data

(62) Division of application No. 16/856,469, filed on Apr. 23, 2020, now Pat. No. 11,732,955, which is a (Continued)

(51) Int. Cl.
*F25D 25/02* (2006.01)
*A61G 12/00* (2006.01)
(Continued)

(52) U.S. Cl.
CPC .......... *F25D 25/025* (2013.01); *A61G 12/001* (2013.01); *F25D 11/022* (2013.01);
(Continued)

(58) Field of Classification Search
CPC ........ F25D 11/022; F25D 13/02; F25D 19/02; F25D 23/003; F25D 23/069;
(Continued)

(56) References Cited

U.S. PATENT DOCUMENTS

| | | |
|---|---|---|
| 3,364,694 A | 1/1968 | Cohen et al. |
| 5,190,185 A | 3/1993 | Blechl |

(Continued)

FOREIGN PATENT DOCUMENTS

| | | |
|---|---|---|
| CN | 1301337 A | 6/2001 |
| CN | 1335924 A | 2/2002 |

(Continued)

OTHER PUBLICATIONS

"The Importance of Using Glycol-Encased Temperature Probes", Available online at http://www.aocucold.com/glycolbasedprobes, Nov. 4, 2017, 14 pages.

(Continued)

*Primary Examiner* — Nelson J Nieves
(74) *Attorney, Agent, or Firm* — Kilpatrick Townsend & Stockton LLP

(57) ABSTRACT

A drawer includes insulation defining a climate-controlled insulated interior of the drawer, and a refrigeration system. The interior of the drawer may be divided into compartments having lids, and actuators may be provided for unlocking the lids. The actuators may include solenoids, which may be disposed outside the climate-controlled interior of the drawer. The drawer may include an air inlet, an outlet, and a fan. The fan may draw air through an air flow path defined at least in part by the insulation.

13 Claims, 13 Drawing Sheets

Related U.S. Application Data division of application No. 15/816,775, filed on Nov. 17, 2017, now Pat. No. 10,663,218.

(51) Int. Cl.
| | | |
|---|---|---|
| *F25D 11/02* | (2006.01) | |
| *F25D 13/02* | (2006.01) | |
| *F25D 19/02* | (2006.01) | |
| *F25D 23/00* | (2006.01) | |
| *F25D 23/06* | (2006.01) | |
| *F25D 27/00* | (2006.01) | |

(52) U.S. Cl.
CPC .............. *F25D 13/02* (2013.01); *F25D 19/02* (2013.01); *F25D 23/003* (2013.01); *F25D 23/069* (2013.01); *F25D 27/005* (2013.01); *F25D 2317/061* (2013.01); *F25D 2400/361* (2013.01); *F25D 2700/12* (2013.01); *F25D 2700/121* (2013.01)

(58) Field of Classification Search
CPC .............. F25D 27/005; F25D 2317/061; F25D 2400/361; F25D 2700/12
See application file for complete search history.

(56) References Cited

U.S. PATENT DOCUMENTS

| | | | |
|---|---|---|---|
| 5,377,864 | A | 1/1995 | Blechl et al. |
| 5,501,076 | A | 3/1996 | Sharp, III et al. |
| 5,661,978 | A | 9/1997 | Holmes et al. |
| 5,745,366 | A | 4/1998 | Higham et al. |
| 5,805,455 | A | 9/1998 | Lipps |
| 5,805,456 | A | 9/1998 | Higham et al. |
| 5,905,653 | A | 5/1999 | Higham et al. |
| 5,927,540 | A | 7/1999 | Godlewski |
| 6,011,999 | A | 1/2000 | Holmes |
| 6,039,467 | A | 3/2000 | Holmes |
| 6,112,547 | A | 9/2000 | Spauschus et al. |
| 6,151,536 | A | 11/2000 | Arnold et al. |
| 6,170,929 | B1 | 1/2001 | Wilson et al. |
| 6,272,394 | B1 | 8/2001 | Lipps |
| 6,385,505 | B1 | 5/2002 | Lipps |
| 6,530,231 | B1 | 3/2003 | Nagy et al. |
| 6,609,047 | B1 | 8/2003 | Lipps |
| 6,640,159 | B2 | 10/2003 | Holmes et al. |
| 6,760,643 | B2 | 7/2004 | Lipps |
| 6,975,922 | B2 | 12/2005 | Duncan et al. |
| 7,348,884 | B2 | 3/2008 | Higham |
| 7,571,024 | B2 | 8/2009 | Duncan et al. |
| 7,675,421 | B2 | 3/2010 | Higham |
| 7,706,915 | B2 | 4/2010 | Mohoaptra et al. |
| 7,835,819 | B2 | 11/2010 | Duncan et al. |
| 8,126,590 | B2 | 2/2012 | Vahlberg et al. |
| 8,196,939 | B2 | 6/2012 | Bustle et al. |
| 8,280,550 | B2 | 10/2012 | Levy et al. |
| 8,991,194 | B2 | 3/2015 | Edwards et al. |
| 8,997,517 | B2 | 4/2015 | Bertolini et al. |
| 9,013,309 | B2 | 4/2015 | Hussain et al. |
| 9,078,520 | B2 | 7/2015 | Shoenfeld |
| 9,242,732 | B2 | 1/2016 | Aurekoski |
| 9,595,241 | B2 | 3/2017 | Zhu et al. |
| 9,605,888 | B2 | 3/2017 | Shin et al. |
| 9,978,139 | B2 | 5/2018 | Kriheli et al. |
| 10,032,130 | B2 | 7/2018 | Bhatia et al. |
| 10,045,899 | B2 | 8/2018 | Sciacchitano et al. |
| 10,362,866 | B2 | 7/2019 | Duval et al. |
| 10,604,967 | B2 | 3/2020 | Sciacchitano et al. |
| 10,663,218 | B2 | 5/2020 | Belligundu |
| 10,853,938 | B2 | 12/2020 | Sandmann et al. |
| 11,536,506 | B2 | 12/2022 | Fisher et al. |
| 11,732,955 | B2 | 8/2023 | Belligundu |
| 2002/0121095 | A1 | 9/2002 | Adamski et al. |
| 2003/0084670 | A1 | 5/2003 | Kim et al. |
| 2003/0115892 | A1 | 6/2003 | Fu et al. |
| 2004/0108795 | A1 | 6/2004 | Meek, Jr. et al. |
| 2005/0236946 | A1 | 10/2005 | LeClear et al. |
| 2006/0016202 | A1 | 1/2006 | Lyvers et al. |
| 2007/0199262 | A1 | 8/2007 | Kern et al. |
| 2007/0228899 | A1 | 10/2007 | McFarland |
| 2008/0148765 | A1 | 6/2008 | Barone et al. |
| 2008/0264962 | A1 | 10/2008 | Schifman et al. |
| 2009/0187274 | A1 | 7/2009 | Higham |
| 2009/0212670 | A1 | 8/2009 | Bustle et al. |
| 2009/0302178 | A1 | 12/2009 | Hampe et al. |
| 2010/0071874 | A1* | 3/2010 | Nojima ................. F25D 17/065 165/61 |
| 2010/0147001 | A1 | 6/2010 | Kim et al. |
| 2010/0218546 | A1 | 9/2010 | Eisele et al. |
| 2010/0300130 | A1 | 12/2010 | Shoenfeld et al. |
| 2011/0101018 | A1 | 5/2011 | Shafir |
| 2012/0055039 | A1* | 3/2012 | Watson ................... D06F 34/26 34/218 |
| 2012/0137706 | A1 | 6/2012 | Hussain et al. |
| 2012/0191241 | A1 | 7/2012 | Rahilly et al. |
| 2012/0203377 | A1 | 8/2012 | Paydar et al. |
| 2012/0304667 | A1* | 12/2012 | Shin ....................... F25B 21/02 62/3.6 |
| 2012/0330462 | A1 | 12/2012 | Maroney et al. |
| 2013/0030566 | A1 | 1/2013 | Shavelsky et al. |
| 2013/0123974 | A1 | 5/2013 | Clarke |
| 2013/0276465 | A1 | 10/2013 | Shin et al. |
| 2015/0198364 | A1* | 7/2015 | Mok ...................... F25D 25/025 312/348.3 |
| 2015/0233648 | A1 | 8/2015 | Goseling |
| 2016/0054047 | A1 | 2/2016 | Lim et al. |
| 2016/0196798 | A1 | 7/2016 | Zhu et al. |
| 2016/0377329 | A1 | 12/2016 | Shin et al. |
| 2016/0379022 | A1 | 12/2016 | Elizondo, II |
| 2017/0205134 | A1 | 7/2017 | Osbar et al. |
| 2019/0003757 | A1 | 1/2019 | Miros et al. |
| 2020/0003462 | A1 | 1/2020 | Sul et al. |
| 2020/0080762 | A1 | 3/2020 | Fisher et al. |
| 2020/0248958 | A1 | 8/2020 | Belligundu |

FOREIGN PATENT DOCUMENTS

| | | | |
|---|---|---|---|
| CN | 1627010 A | 6/2005 | |
| CN | 202092793 U | 12/2011 | |
| CN | 102582950 A | 7/2012 | |
| CN | 203133951 U | 8/2013 | |
| CN | 106979645 A | 7/2017 | |
| DE | 10032130 A1 * | 2/2001 | ............ F25D 19/02 |
| EP | 2551618 A2 | 1/2013 | |
| EP | 2983993 A1 | 8/2019 | |
| FR | 2777985 A1 | 10/1999 | |
| FR | 2797684 A1 | 2/2001 | |
| JP | 4976923 U | 7/1974 | |
| JP | 5839349 Y2 | 9/1983 | |
| JP | 60102482 A | 6/1985 | |
| JP | 0526563 A | 2/1993 | |
| JP | 0635438 U | 5/1994 | |
| JP | 06304230 A | 11/1994 | |
| JP | 10248658 A | 9/1998 | |
| JP | 2001091173 A | 4/2001 | |
| JP | 2001526069 A | 12/2001 | |
| JP | 2002195721 A | 7/2002 | |
| JP | 2009204294 A | 9/2009 | |
| JP | 4538029 B2 | 6/2010 | |
| JP | 2014500210 A | 1/2014 | |
| JP | 2015521272 A | 7/2015 | |
| KR | 200170050 Y1 | 3/2000 | |
| KR | 20080045693 A | 5/2008 | |
| KR | 20110130677 A | 12/2011 | |
| WO | 2012075449 A2 | 6/2012 | |
| WO | 2019109048 A1 | 6/2019 | |

OTHER PUBLICATIONS

U.S. Appl. No. 15/816,775, Non-Final Office Action, Mailed on Aug. 21, 2019, 16 pages.

(56) References Cited

OTHER PUBLICATIONS

U.S. Appl. No. 15/816,775 , Notice of Allowance, Mailed on Jan. 24, 2020, 8 pages.
U.S. Appl. No. 16/129,579 , Advisory Action, Mailed on May 4, 2022, 6 pages.
U.S. Appl. No. 16/129,579 , "Corrected Notice of Allowability", Nov. 2, 2022, 2 pages.
U.S. Appl. No. 16/129,579 , Final Office Action, Mailed on Dec. 30, 2021, 5 pages.
U.S. Appl. No. 16/129,579 , Non-Final Office Action, Mailed on Nov. 27, 2020, 11 pages.
U.S. Appl. No. 16/129,579 , Non-Final Office Action, Mailed on Jun. 10, 2021, 13 pages.
U.S. Appl. No. 16/129,579 , Non-Final Office Action, Mailed on May 13, 2020, 19 pages.
U.S. Appl. No. 16/129,579 , "Notice of Allowability", Nov. 23, 2022, 3 pages.
U.S. Appl. No. 16/856,469 , Notice of Allowance, Mailed on Jul. 21, 2022, 5 pages.
U.S. Appl. No. 16/856,469 , "Corrected Notice of Allowability", Jul. 19, 2023, 3 pages.
U.S. Appl. No. 16/856,469 , Non-Final Office Action, Mailed on Aug. 25, 2022, 12 pages.
U.S. Appl. No. 16/856,469 , Notice of Allowance, Mailed on Mar. 24, 2023, 7 pages.
AU2018368950 , "First Examination Report", Aug. 21, 2023, 3 pages.
Application No. BR112020008858-7 , Office Action, Mailed on Sep. 27, 2022, 4 pages.
Application No. CN201880074315.7 , Office Action, Mailed on Jul. 19, 2021, 11 pages.
Application No. CN201880074315.7 , Office Action, Mailed on Jun. 20, 2023, 3 pages.
Application No. CN201880074315.7 , Office Action, Mailed on Jul. 21, 2022, 9 pages.
Application No. CN201880074315.7 , Office Action, Mailed on Mar. 4, 2022, 9 pages.
Application No. CN201880074315.7 , Office Action, Mailed on Nov. 2, 2022, 9 pages.
Application No. EP18878839.2 , Office Action, Mailed on Aug. 21, 2023, 5 pages.
Application No. EP18880996.6, Extended European Search Report, Mailed on Aug. 23, 2021, 10 pages.
Application No. JP2020-523708 , Notice of Allowance, Mailed on May 30, 2023, 7 pages.
Application No. JP2020-523708 , Office Action, Mailed on Aug. 9, 2022, 17 pages.
Application No. JP2020-523708 , Office Action, Mailed on Feb. 14, 2023, 6 pages.
Application No. KR10-2020-7016722 , Notice of Decision to Grant, Mailed on Jul. 28, 2023, 8 pages.
Application No. KR10-2020-7016722 , Office Action, Mailed on May 10, 2023, 36 pages.
Application No. PCT/US2018/061426 , International Preliminary Report on Patentability, Mailed on May 28, 2020, 14 pages.
Application No. PCT/US2018/061426 , International Search Report and Written Opinion, Mailed on Mar. 27, 2019, 16 pages.
China Application No. 201880074315.7, Notice of Grant, Mailed Oct. 28, 2023, 4 pages, China National Intellectual Property Administration; Beijing, China.
U.S. Appl. No. 17/969,470, Non-Final Office Action, Mailed on Aug. 29, 2019, 16 pages; United States Patent and Trademark Office, Alexandria VA US.
Canada Application No. 3,079,749, Office Action, Mailed Nov. 27, 2023, 9 pages, Canadian Intellectual Property Office, Quebec, Canada.
Canada Application No. 3,079,749, Office Action, Mailed Sep. 11, 2024, 3 pages, Canadian Intellectual Property Office, Quebec, Canada.
Brazil Application No. BR112020008858-7, Office Action mailed Mar. 19, 2024; 3 pages, Brazilian National Institute of Industrial Property, Rio de Janeiro, Brazil.
Brazil Application No. BR112020008858-7, Notice of Allowance mailed Jul. 30, 2024; 3 pages, Brazilian National Institute of Industrial Property, Rio de Janeiro, Brazil.
Australian Application No. 2018368950, Office Action mailed Jul. 2, 2024; 3 pages; IP Australia, Phillip ACT 2606 AU.
Australian Application No. 2018368950, Notice of Acceptance mailed Jul. 23, 2024; 3 pages; IP Australia, Phillip ACT 2606 AU.
European Application No. 18 878839.2-1015, Office Action mailed Aug. 12, 2024; 4 pages; European Patent Office, Rijswijk, Netherlands.
U.S. Appl. No. 17/969,470, "Final Office Action", Jan. 15, 2025, 9 pages.
U.S. Appl. No. 17/969,470, "Non-Final Office Action", Aug. 29, 2024, 8 pages.
AU2018368950, "Second Examination Report", Jul. 2, 2024, 3 pages.
EP18878839.2, "Extended European Search Report", Aug. 31, 2021, 7 pages.

* cited by examiner

DISPENSING SYSTEM WITH TEMPERATURE CONTROLLED DRAWERS

CROSS-REFERENCE TO RELATED APPLICATIONS

This application is a divisional of U.S. patent application Ser. No. 16/856,469, filed Apr. 23, 2020, which is a divisional of U.S. patent application Ser. No. 15/816,775, filed Nov. 17, 2017, the disclosure of which is incorporated by reference herein in its entirety

BACKGROUND OF THE INVENTION

Many industries rely on the accurate inventory and dispensing of secure items. For example, in a hospital setting, it is of paramount importance that patients be given the correct medications in the correct doses. In addition, it is legally required that controlled substances be secured and accurately tracked, and it is also important that inventories of medications and supplies be tracked so that proper business controls can be implemented.

Different medications may have different storage requirements. For example, some medications or supplies may require refrigeration, while others do not. Items requiring refrigeration may present special difficulties, as they are typically simply stored in a refrigerator. Even though the refrigerator may be locked, once the refrigerator is accessed, all items in the refrigerator are accessible and subject to mistaken retrieval, diversion, or other problems.

BRIEF SUMMARY OF THE INVENTION

According to one aspect, a device for dispensing items comprises cabinet and a drawer within the cabinet. The drawer includes one or more compartments for storing items and a refrigeration system within the drawer. The refrigeration system is configured to maintain the one or more compartments in the drawer at a temperature below the temperature of the environment surrounding the cabinet. The drawer further comprises thermal insulation at sides of the drawer and thermal insulation beneath the one or more compartments.

According to another aspect, a drawer comprises an outer shell, and insulation defining a climate-controlled interior of the drawer. The drawer further includes a refrigeration system having a compressor and a condenser disposed within the drawer but outside the climate-controlled interior of the drawer, and having an evaporator disposed within the climate-controlled interior of the drawer. The drawer further includes one or more dividers defining one or more compartments within the climate-controlled interior of the drawer, one or more lids covering the one or more compartments, an electrical interface for receiving power and control signals, and one or more actuators coupled to the one or more lids for locking and unlocking the one or more compartments in response to control signals received via the electrical interface.

DETAILED DESCRIPTION OF THE INVENTION

Figure 1:
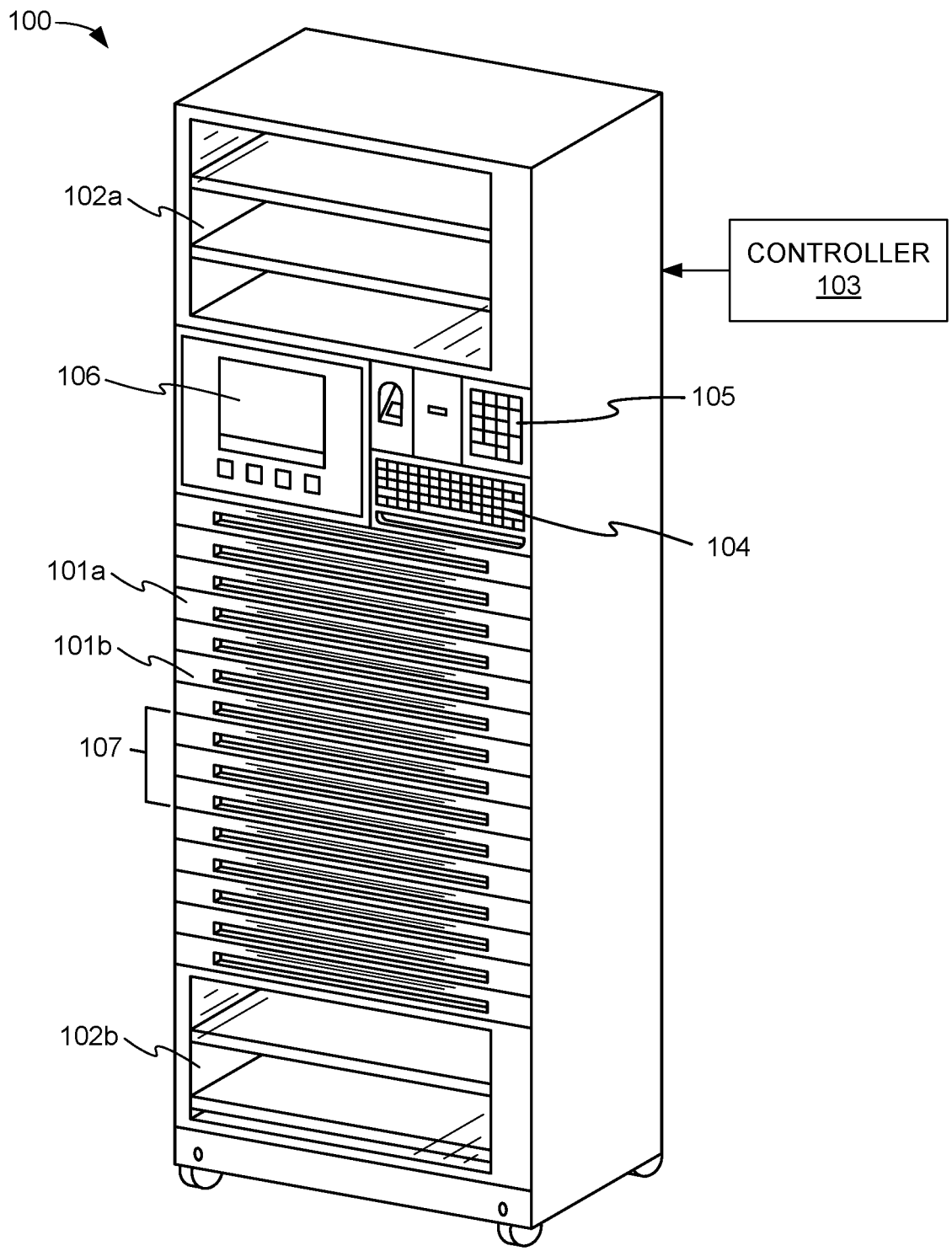
FIG. 1 illustrates a dispensing cabinet in which the invention may be embodied.

FIG. 1 illustrates a dispensing cabinet 100 in accordance with embodiments of the invention. Cabinet 100 includes a plurality of compartments, including drawers 101a, 101b, and 107, and compartments accessible through doors 102a and 102b. Dispensing cabinet 100 also includes a computerized controller 103, and one or more data entry devices such as keyboard 104 and keypad 105. A display 106 enables communication of information to a user of dispensing cabinet 100. In accordance with embodiments of the invention, drawer 107 includes a refrigeration system as discussed in more detail below. In some embodiments, a dispensing cabinet may include other devices as well.

While devices embodying the invention may be used in a variety of applications, embodiments may be particularly useful in the medical field. For example, dispensing cabinet 100 may hold medications or medical supplies, and may facilitate the accurate dispensing and tracking of medications or other medical supplies.

Computerized controller 103 may include a processor, memory, input/output interfaces, and other components. Controller 103 may communicate remotely with other computerized systems, such as medical records systems, inventory and accounting systems, and the like.

The various storage compartments such as drawers 101a, 101b and 107 may be under the control of controller 103. For example, each of drawers 101a, 101b and 107 may include an electronically-controllable locking mechanism, and may only be openable under the control of controller 103. In addition, controller 103 may store information about what supplies are stored in which compartments of medication storage cabinet 100. In one typical basic usage scenario, a health care worker may enter, using keyboard 104 or another input device, an identification of a patient who is under the care of the health care worker, and who will need medication during the worker's current rounds. Controller 103 may access the patient's medical file and determine what medications have been prescribed for that patient. Controller 103 may then permit access only to the drawer or drawers containing the prescribed medications for the patient. A particular compartment such as a bin within the correct drawer may also be highlighted, for example with a lighted indicator, to draw the health care worker to the correct medication. The health care worker can then remove the patient's prescribed medication. The level of control exercised by controller 103 may help in preventing medication and dosing errors, by reducing the likelihood that a health care worker will remove an incorrect medication from medication dispensing cabinet 100. In addition, controller 103 may document and record which medication was dispensed, and may forward that information via a wired or wireless electronic network to inventory and accounting systems.

Many other features and functions are possible as well. For example, the health care worker may enter his or her identification as well, and controller 103 may provide access only to those medications and supplies for which the worker is authorized to access.

While medication dispensing cabinet 100 is shown as a stationary device, the invention is not so limited. Cabinets according to other embodiments may be portable, for example to facilitate transporting medications and supplies from a central supply store to a particular ward or department of a facility. It will be recognized that the particular arrangement of drawers, doors, or other features of a cabinet according to embodiments of the invention may be varied. For example, some cabinets or dispensing carts embodying the invention may use only drawers.

Many different sizes and styles of compartments may be used, depending on the sizes of materials to be dispensed, and the level of security required for them.

A cabinet embodying the invention may include guides or mounting features spaced a standardized distance apart, and different drawers may span different multiples of the spacing distance. A drawer spanning only the spacing distance may be called a "single" height drawer. A drawer spanning two of the spacing distance may be called a "double" height drawer. Triple height and taller drawers are also possible. A cabinet such as cabinet 100 may be configured with combinations of drawer heights, depending on the sizes of the items to be stored. In the example of FIG. 1, drawer 101b is a single height drawer, while drawer 107 is a triple height drawer.

Figure 2:
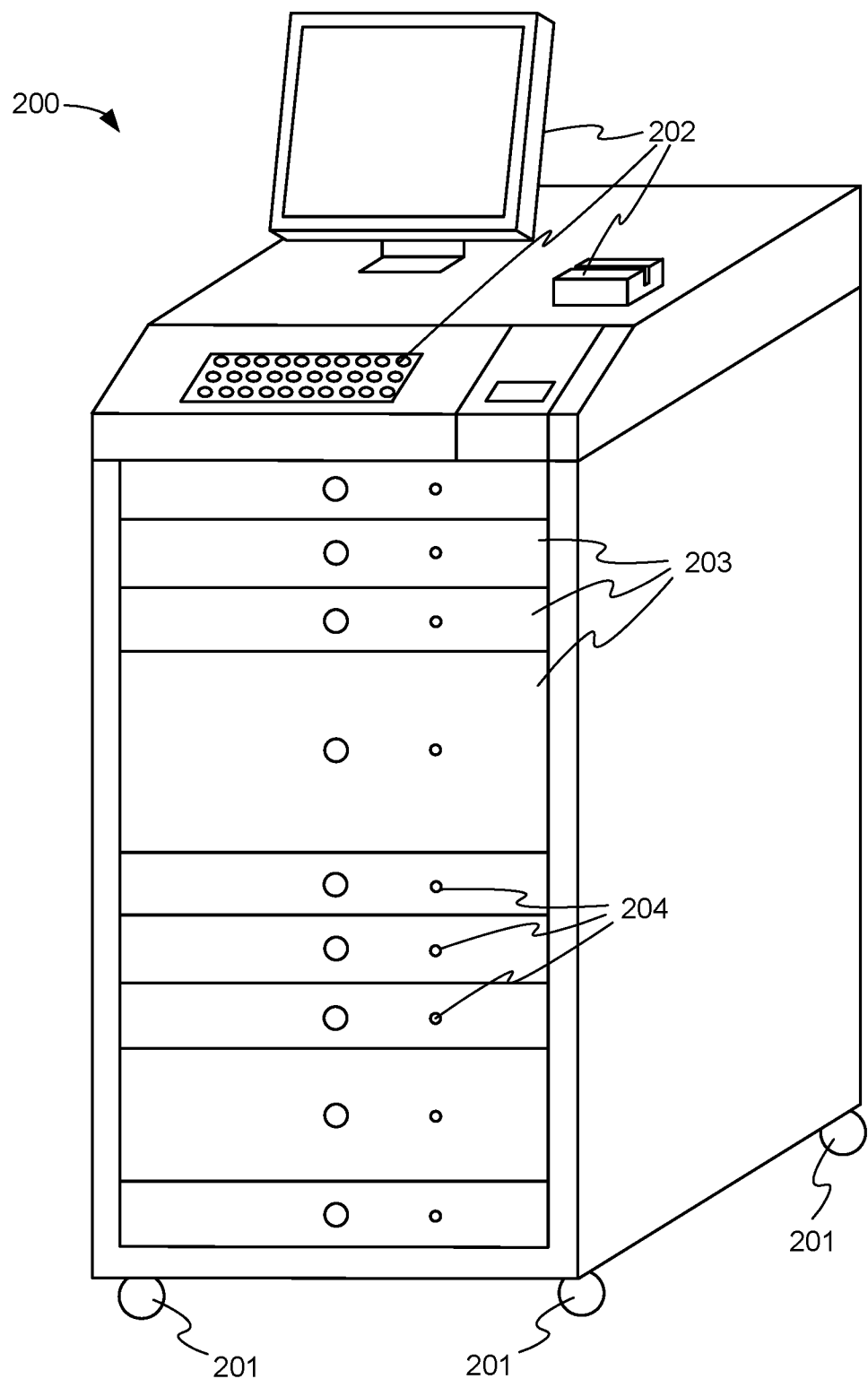
FIG. 2 illustrates a portable dispensing device in which the invention may be embodied.

FIG. 2 illustrates a portable dispensing device 200 in which the invention may be embodied. Preferably, portable dispensing device 200 can perform functions similar to those described above with respect to dispensing cabinet 100. Dispensing device 200 includes wheels 201 to enable a health care worker to wheel the device from room to room. Dispensing device 200 may include one or more batteries, to power a computerized controller that performs tasks similar to controller 103 discussed above, and to provide power for other functions of dispensing device 200. In addition, dispensing device 200 can preferably be connected to mains power when convenient, for charging the batteries and for powering the device without drawing on the battery when the device will be at a particular location for a period of time. Various input/output devices 202 may be provided, and may be especially adapted for portability, for example to minimize power consumption. Dispensing device 200 also includes a number of drawers 203 of varying heights. Each drawer 203 may include a visual indicator 204 for guiding a user to a particular drawer 203, as is explained in more detail below. One or more of drawers 203 may include a refrigeration system in accordance with embodiments of the invention. Other drawers within cabinet 100 may not be refrigerated.

Additional types of dispensing units in which the invention may be embodied or which include features usable with embodiments of the invention are described in the following commonly owned U.S. Patents and patent applications, the contents of which are hereby incorporated by reference: U.S. Pat. No. 6,272,394, issued on Aug. 7, 2001 to Lipps, U.S. Pat. No. 6,385,505, issued on May 7, 2002 to Lipps, U.S. Pat. No. 6,760,643, issued on Jul. 6, 2004 to Lipps, U.S. Pat. No. 5,805,455, issued on Sep. 8, 1998 to Lipps, U.S. Pat. No. 6,609,047, issued on Aug. 19, 2003 to Lipps, U.S. Pat. No. 5,805,456, issued on Sep. 8, 1998 to Higham et al., U.S. Pat. No. 5,745,366, issued on Apr. 28, 1998 to Higham et al., an U.S. Pat. No. 5,905,653, issued on May 18, 1999 to Higham et al., U.S. Pat. No. 5,927,540, issued on Jul. 27, 1999 to Godlewski, U.S. Pat. No. 6,039,467, issued on Mar. 21, 2000 to Holmes, U.S. Pat. No. 6,640,159, issued on Oct. 28, 2003 to Holmes et al., U.S. Pat. No. 6,151,536, issued on Nov. 21, 2000 to Arnold et al., U.S. Pat. No. 5,377,864, issued on Jan. 3, 1995 to Blechl et al., U.S. Pat. No. 5,190,185, issued on Mar. 2, 1993 to Blechl, U.S. Pat. No. 6,975,922, issued on Dec. 13, 2005 to Duncan et al., U.S. Pat. No. 7,571,024, issued on Aug. 4, 2009 to Duncan et al., U.S. Pat. No. 7,835,819, issued on Nov. 16, 2010 to Duncan et al., U.S. Pat. No. 6,011,999, issued on Jan. 4, 2000 to Holmes, U.S. Pat. No. 7,348,884, issued on Mar. 25, 2008 to Higham, U.S. Pat. No. 7,675,421, issued on Mar. 9, 2010 to Higham, U.S. Pat. No. 6,170,929, issued on Jan. 9, 2001 to Wilson et al., U.S. Pat. No. 8,126,590, issued on Feb. 28, 2012 to Vahlberg et al., U.S. Pat. No. 8,280,550, issued in Oct. 2, 2012 to Levy et al., and U.S. Patent Application Publication No. 2012/0203377 of Paydar et al., published on Aug. 9, 2012.

Figure 3:
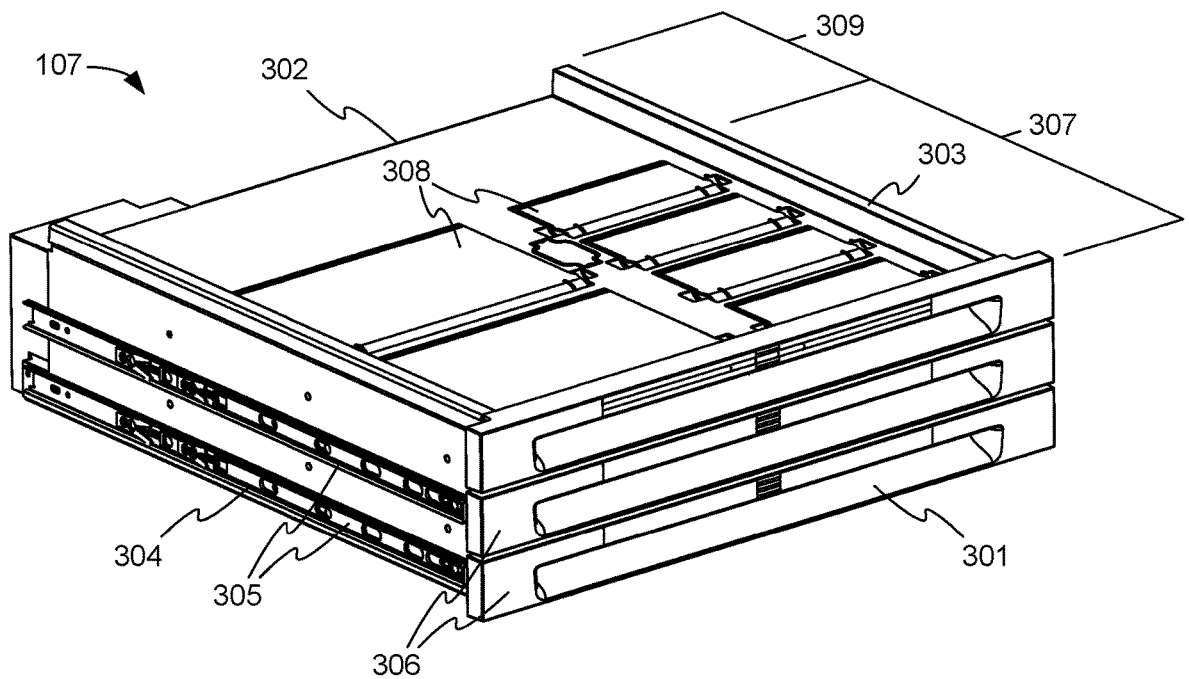
FIG. 3 illustrates a front upper oblique view of a drawer, in accordance with embodiments of the invention.

FIG. 3 illustrates a front upper oblique view of drawer 107 in more detail, in accordance with embodiments of the invention. Drawer 107 has a front side 301, a back side 302, and right and left sides 303 and 304, as viewed from front side 301. Front side 301 is the side that would show at the front of a cabinet once drawer 107 is installed in the cabinet, and is the side from which a user would access drawer 107. Drawer 107 may include guides 305 for mounting drawer 107 into a cabinet such as cabinet 100, and enabling drawer to slide open (in the direction of front side 301) and closed (with drawer 107 substantially entirely within the cabinet). One or more fascia pieces 306 provide a decorative look to the front of drawer 107, may provide an undercut handle for the user to grip in opening drawer 107, and may include other features as described in more detail below.

Front portion 307 of drawer 107 includes a number of compartments, which in FIG. 3 are covered by lids 308. Rear portion 309 houses parts of a refrigeration system, described in more detail below.

Figure 4:
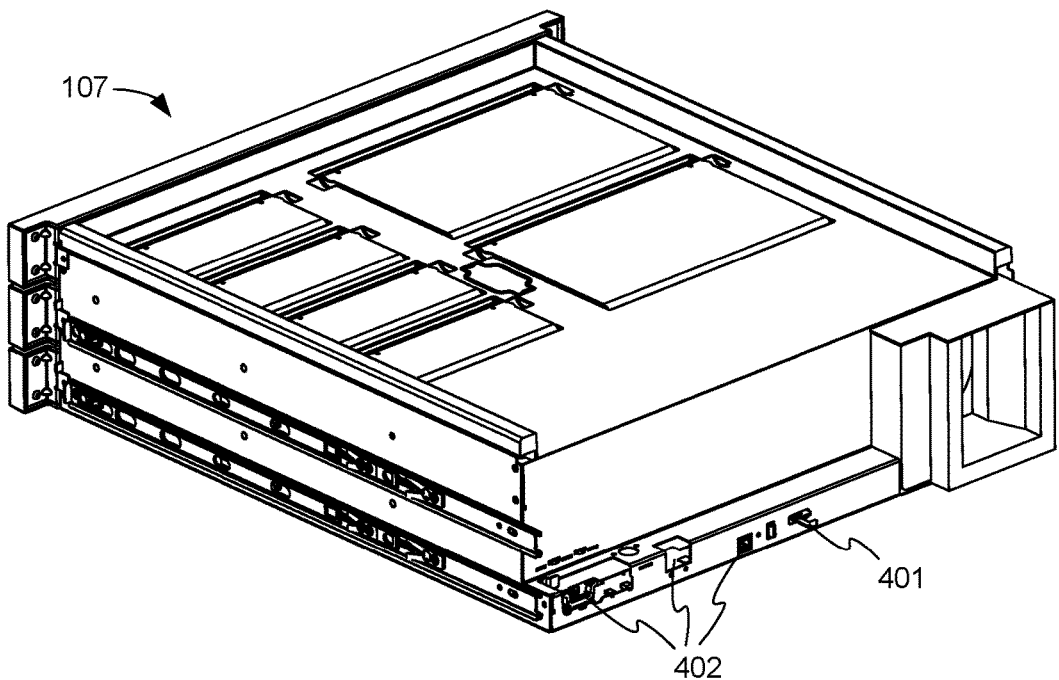
FIG. 4 shows a rear upper oblique view of the drawer of FIG. 3, in accordance with embodiments of the invention.

FIG. 4 shows a rear upper oblique view of drawer 107. A mechanical latch 401 may be provided, which may interact with cabinet 100. For example, controller 103 may control latch so that drawer 107 can be opened only if a worker requesting access to drawer 107 has provided proper credentials. Lids 308 may be similarly controllable, so that only the storage location holding the required medicine or supplies is openable by the worker.

Various electrical connectors 402 may be provided, to which cables (not shown) may be attached, so that drawer 107 can receive electrical power from cabinet 100 and may communicate with controller 103.

Figure 5:
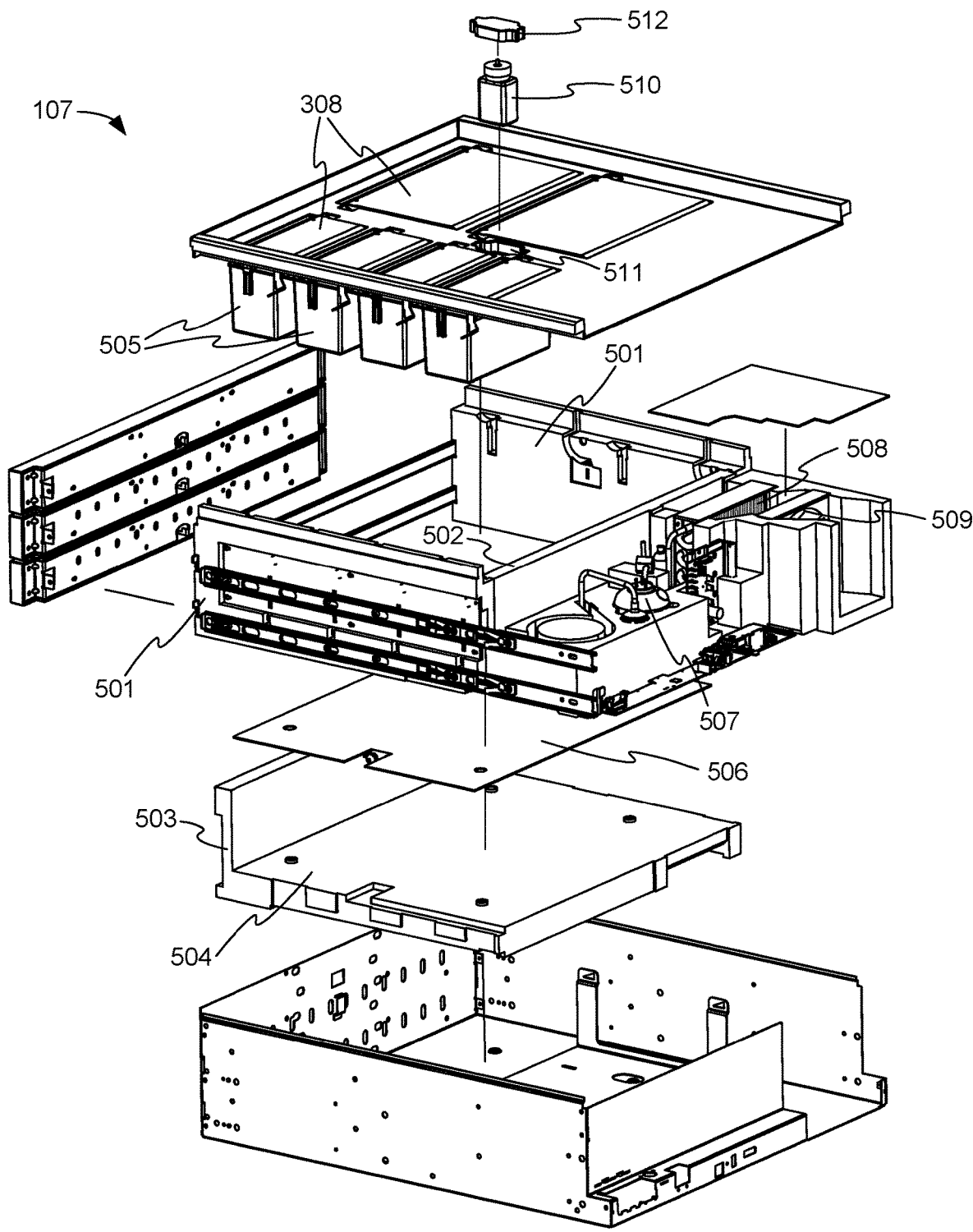
FIG. 5 shows an upper exploded view of the drawer of FIG. 3, in accordance with embodiments of the invention.
Figure 6:
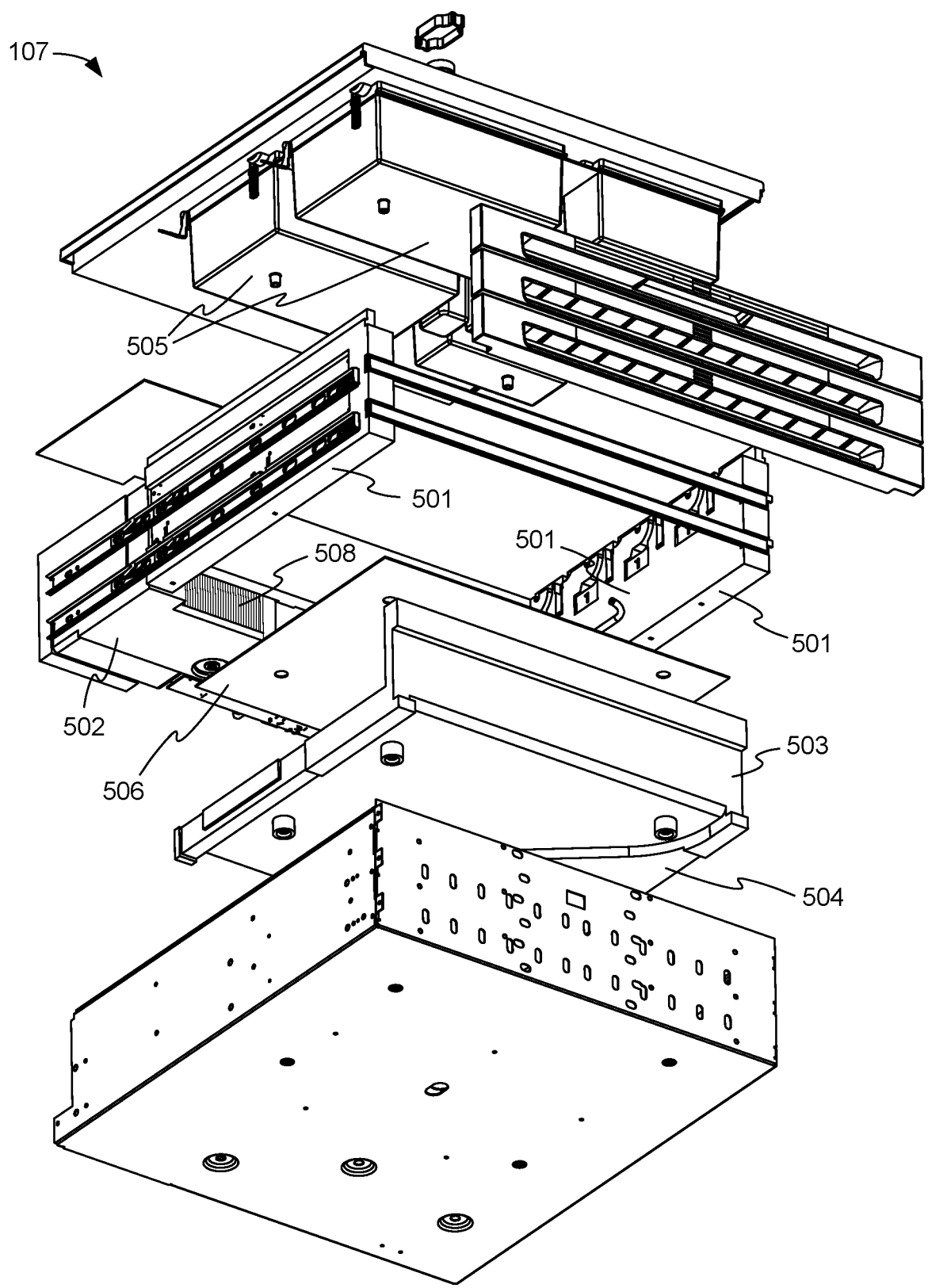
FIG. 6 shows a lower exploded view of the drawer of FIG. 3, in accordance with embodiments of the invention.

FIGS. 5 and 6 show upper and lower exploded views of drawer 107, in accordance with embodiments of the invention. The interior of drawer 107 is essentially surrounded by insulation, including side insulation panels 501, back insulation panel 502, front insulation panel 503, and bottom insulation panel 504. Insulation panels 501-504 may be made of any suitable insulating material, for example a moldable foam insulation such as polyisocyanurate, polystyrene, polyurethane, or another kind of insulation. While four different insulation panels are shown, the insulation may be formed by more or fewer different segments. For example, front insulation panel 503 may be molded monolithically with bottom insulation panel 504. Other combinations are possible as well. (Insulation of the top of drawer 107 will be discussed below.)

Compartments 505 reside in the chamber formed by insulation panels 501-504.

Compartments 505 may be defined by a divider made of any suitable material and formed by any suitable process, but may conveniently molded from a polymer such as polycarbonate, ABS, another polymer, or a blend of polymers. In other embodiments, compartments 505 may be made from a metal such as stainless steel, aluminum, or another suitable metal. Compartments 505 may be integrally formed from a single piece of material, or may be separate from each other and placed into drawer 107 in a workable combination. Compartments 505 are covered by lids 308.

An evaporator 506 is disposed between compartments 505 and bottom insulation panel 504. Evaporator 506 is part of a refrigeration system integrated into drawer 107. Evaporator 506 may be, for example, a roll-bonded evaporator, formed by roll bonding two sheets of metal with a pattern of channels marked on them, and then inflating the channels to form a network or serpentine passage through the channels for the flow of refrigerant. Evaporator 506 absorbs thermal energy from the interior of drawer 107 by virtue of its low temperature, and carries it outside the interior of drawer 107, cooling the interior of drawer 107, including compartments 505.

Other parts of the refrigeration system include a compressor 507 and a condenser 508, along with an expansion valve (not shown). These parts form the components implementing a traditional refrigeration cycle. The refrigeration system preferably uses a refrigerant that does not contain chlorinated fluorocarbons (CFCs).

A fan 509 draws air through condenser 508 to cool the refrigerant after the refrigerant has been heated in evaporator 506 and compressed in compressor 507, to expel thermal energy outside of cabinet 100.

A glycol bottle 510 may be provided, and may fit in a special compartment 511 in the interior of drawer 107, with its own lid 512. Preferably, a temperature sensor is submerged in glycol within bottle 510, and connected to controller 103 so that controller 103 can monitor the temperature of the interior of drawer 107. The glycol serves to buffer the sensor from rapid fluctuations in apparent temperature that may be caused by, for example, openings of drawer 107 from cabinet 100. In some embodiments, controller 103 may signal the refrigeration system to cycle on and off based on the temperature as sensed by the temperature sensor.

Figure 7:
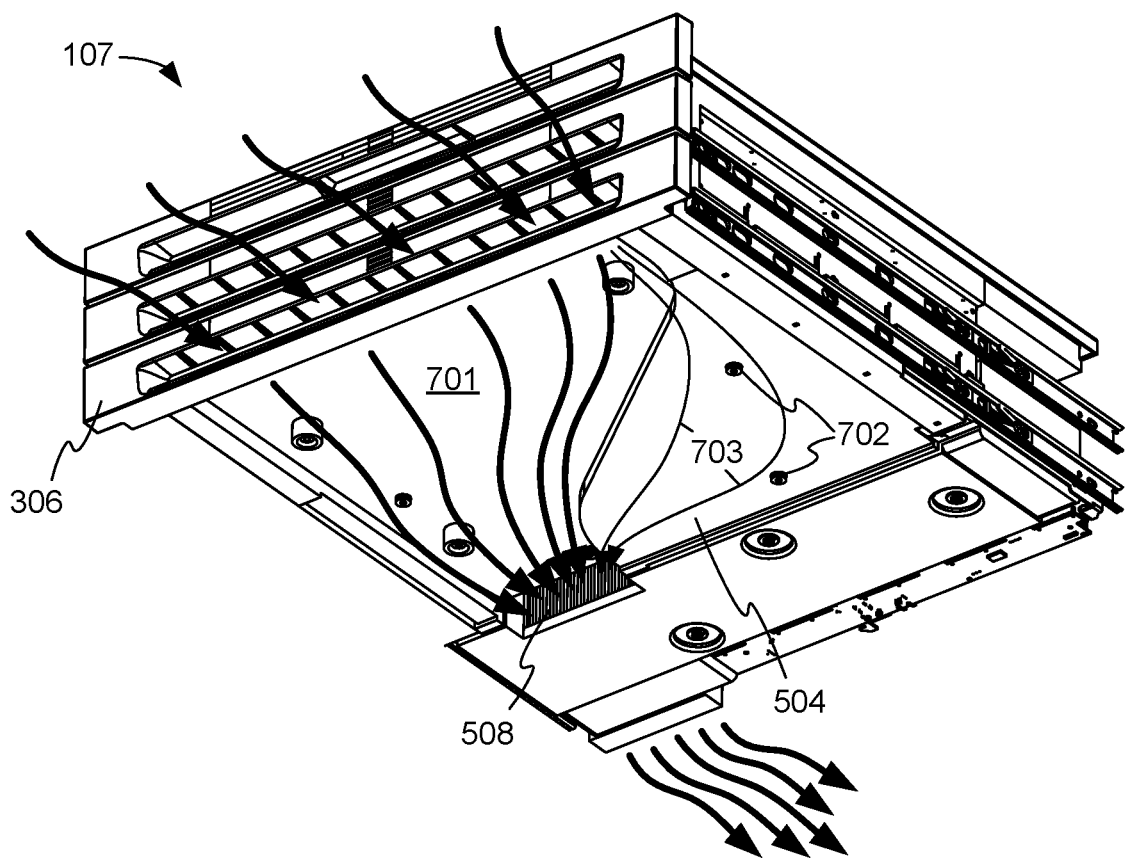
FIG. 7 shows an underside oblique view of the drawer of FIG. 3, with its bottom cover removed.

FIG. 7 shows an underside oblique view of drawer 107, with its bottom cover removed, exposing bottom insulation panel 504. In this example embodiment, bottom insulation panel 504 has a funnel-shaped air flow path 701 molded into it. When drawer 107 is fully assembled, a bottom panel (not shown) forms the remaining side of air flow path 701. Air may enter air flow path 701 through an opening in the front side of drawer 107, for example an opening hidden in one of fascia pieces 306. The funnel shape of air flow path 701 directs the air to condenser 508 under the impetus of fan 509 (not visible in FIG. 7). After flowing through condenser 508, the air is exhausted to the environment at the back of cabinet 100.

This air flow arrangement serves multiple purposes. First, it provides cooling air to condenser 508, for cooling the refrigerant in the refrigeration system as part of the refrigeration cycle. The air is exhausted from the back of cabinet 100 rather than the front, which may be preferable for user comfort. And second, the air flow under insulation panel 504 can evaporate and exhaust any condensation that my form under insulation panel 504. Standoffs 702 may hold the back cover away from insulation panel 504, permitting at least a small amount of air 703 to flow over substantially the entire underside of insulation panel 504.

Figure 8:
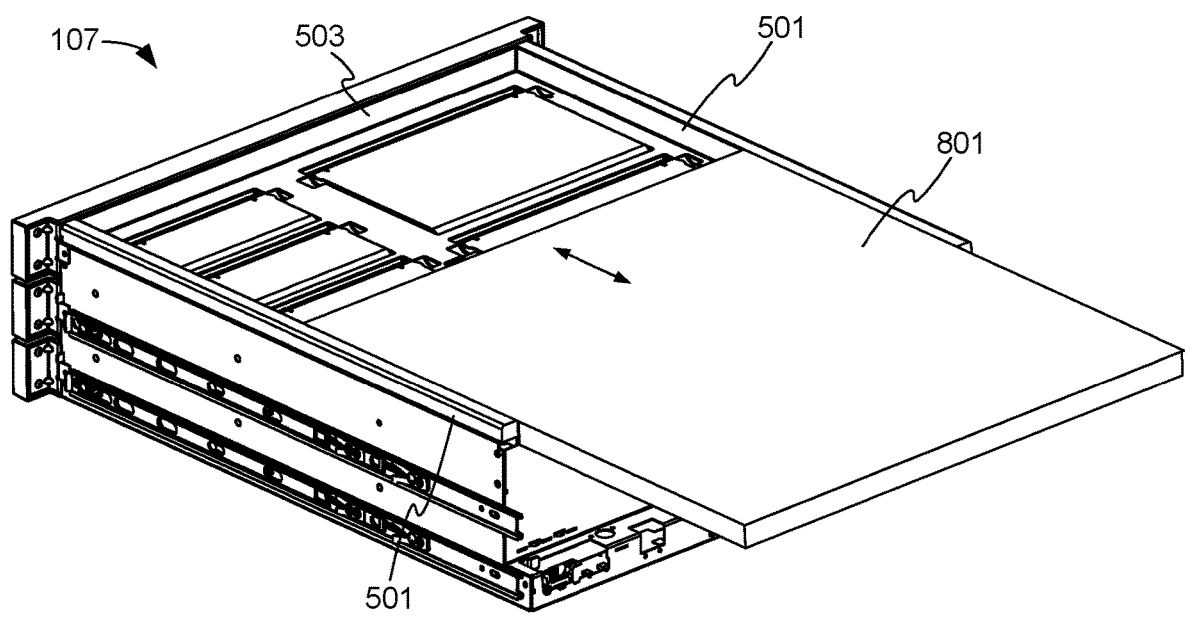
FIG. 8 shows an upper rear oblique view of the drawer of FIG. 3, in accordance with embodiments of the invention.

FIG. 8 shows an upper rear oblique view of drawer 107, in accordance with embodiments of the invention. The view of FIG. 8 is similar to the view of FIG. 4, with the addition of a top insulation panel 801. Top insulation panel 801 may be shaped and sized to slide into an open recess left in the top of drawer 107 by the other components. For example, top insulation panel 801 may fit between the tops of side insulation panels 501 and may contact front insulation panel 503 when top insulation panel 801 if fully installed on drawer 107. Top insulation panel 801 may also contact back insulation panel 502 (not visible in FIG. 8) so that the interior of drawer 107 is essentially encased in insulation. Top insulation panel 108 is preferably mounted in cabinet 100 such that top insulation panel 801 remains inside cabinet 100 when drawer 107 is opened, so as not to interfere with access to the compartments in drawer 107. When drawer 107 is closed, top insulation panel 801 automatically covers drawer 107 again.

In other embodiments, top insulation panel 801 may travel with drawer 107 when drawer 107 is opened, and the user may simply slide top insulation panel 801 back toward cabinet 100 to gain access to the interior of drawer 107.

Top insulation panel 801 may be made of any suitable material, for example a material similar to the material of the other insulation panels, or a different material.

Figure 9:
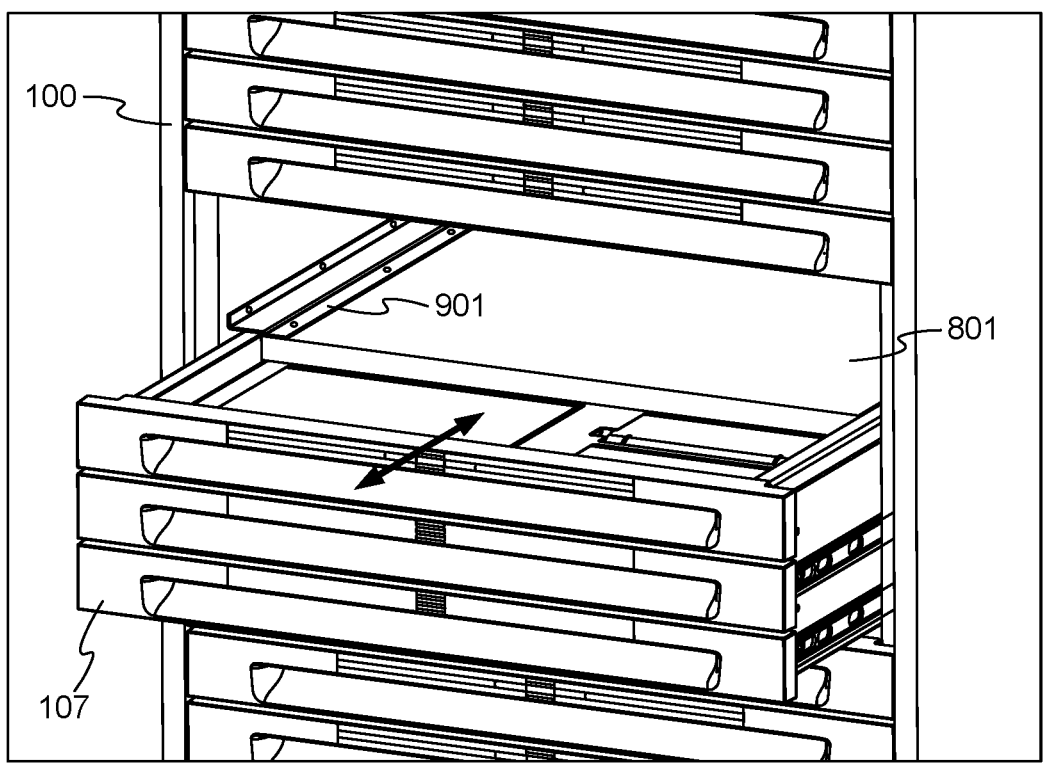
FIG. 9 illustrates a partial view of the cabinet of FIG. 1, with an insulation panel in place according to embodiments of the invention.

FIG. 9 illustrates a partial view of cabinet 100 with insulation panel 801 in place above drawer 107. Drawers immediately above drawer 107 have been removed. As drawer 107 is opened and closed, insulation panel 801 remains in place, so that the interior of drawer 107 is accessible when drawer 107 is open, but drawer 107 is fully insulated when closed. In the example of FIG. 9, a bracket 901 holds insulation panel 801 in place within cabinet 100, and drawer 107 slides beneath insulation panel 801. However, other arrangements are possible.

Figure 10:
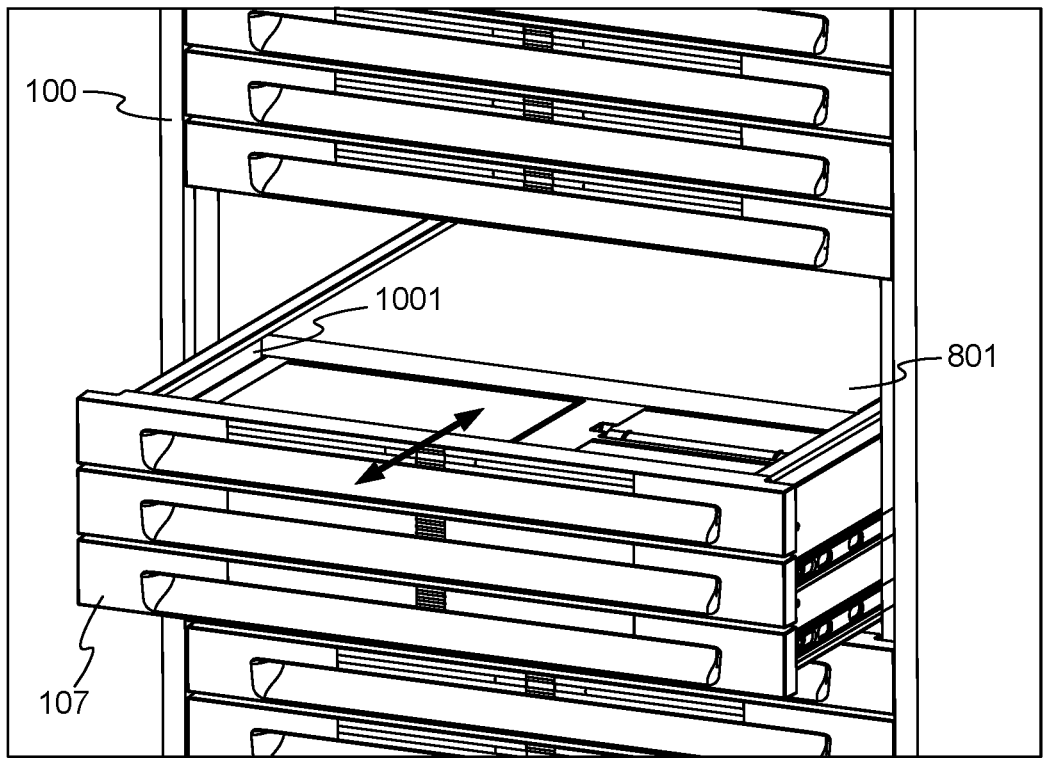
FIG. 10 illustrates another embodiment of the cabinet of FIG. 1 with an insulation panel in place according to embodiments of the invention.

For example, FIG. 10 illustrates another embodiment, in which insulation panel 801 is slidingly captured within a groove 1001 in the side of drawer 107. Insulation panel 801 may be attached to a back wall of cabinet 100 so that insulation panel 801 does not slide out of cabinet 100 when drawer 107 is opened. In other embodiments, insulation panel 801 may simply be pushed back by the user to expose the interior of drawer 107 when drawer 107 is open.

Figure 11:
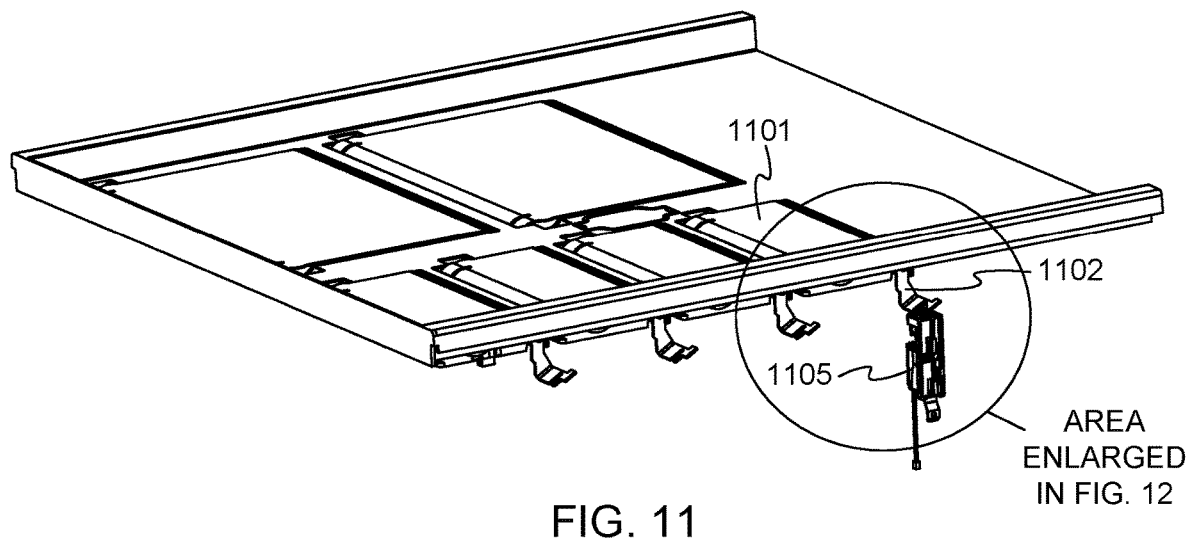
FIG. 11 shows an upper oblique view of the top of the drawer of FIG. 3 with many components removed, to reveal a mechanism for achieving computer control of access to the individual storage bins within the drawer, in accordance with embodiments of the invention.
Figure 12:
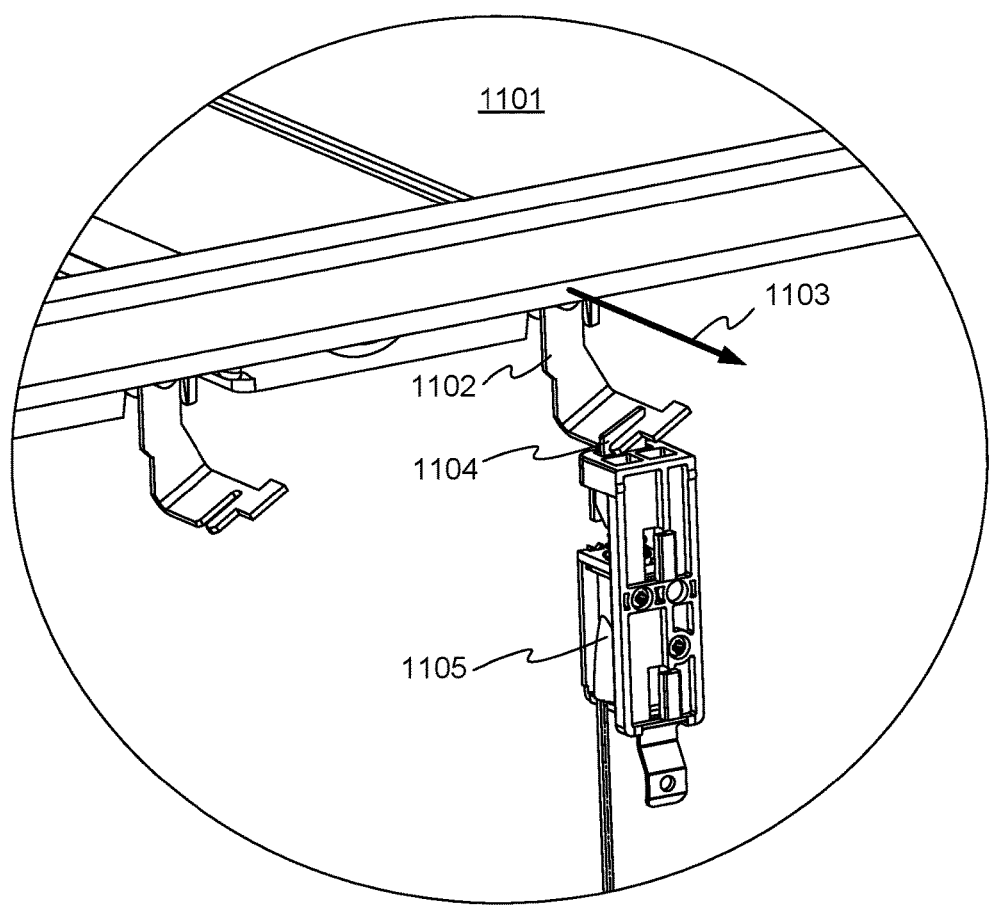
FIG. 12 shows a portion of FIG. 11 in more detail.

Because the interior of drawer 107 is at a cold temperature, it may be desirable to keep electronic and electromechanical components out of the interior of drawer 107 to the extent possible, to avoid potential cold-induced problems. For example, FIG. 11 shows an upper oblique view of the top of drawer 107 with many components removed, to reveal a mechanism for achieving computer control of access to the individual storage bins in drawer 107. FIG. 12 shows a portion of FIG. 11 in more detail. In this example, lid 1101 includes a lever 1102 configured to rotate with lid 1101 about an axis 1103. In the position shown, a blade 1104 connected to an armature of a solenoid 1105 blocks rotation of lever 1102, and therefore of lid 1101. In this condition, the bin under lid 1101 is locked.

Figure 13:
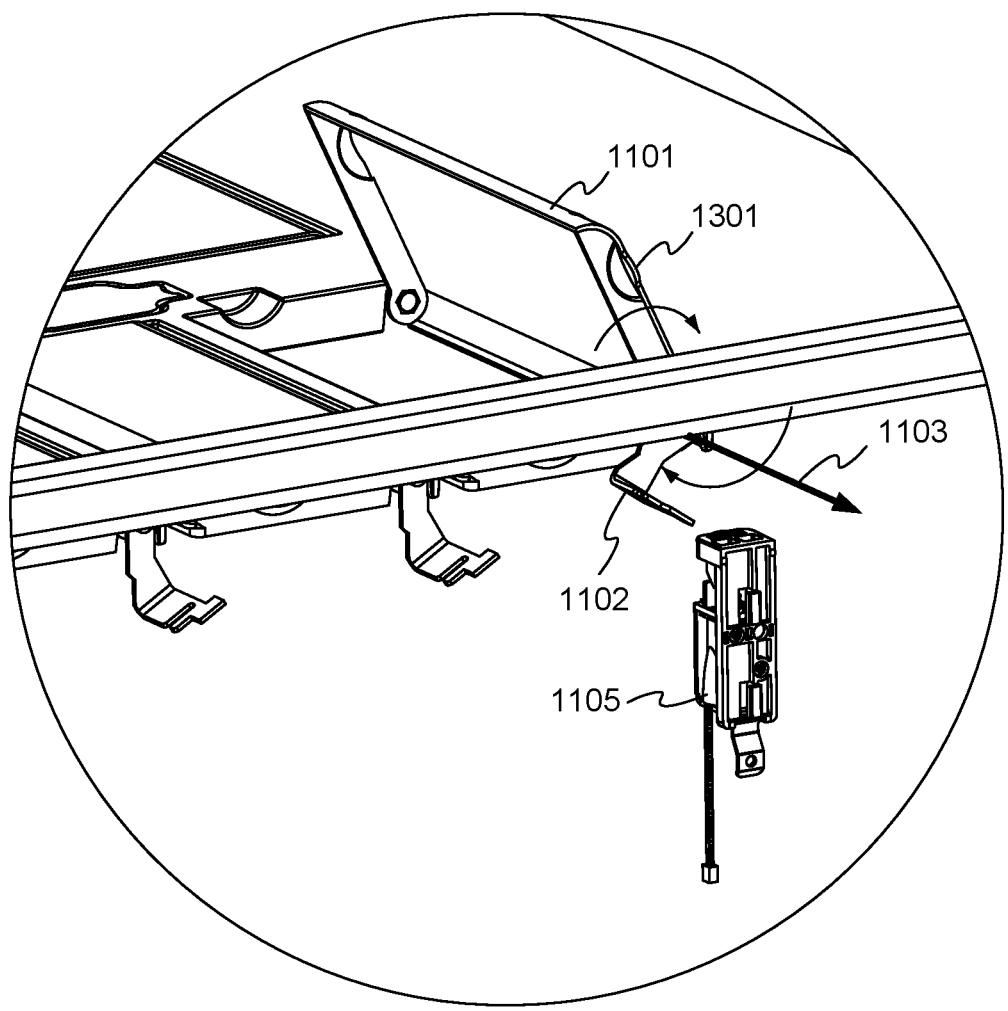
FIG. 13 shows a lid of a compartment of the drawer of FIG. 3 in an open position, in accordance with embodiments of the invention.

However, when solenoid 1105 is energized, for example under control of controller 103, blade 1104 is withdrawn, allowing lever 1102 and lid 1101 to rotate to an open position. FIG. 13 shows lid 1101 in the open position. For example, the user may lift lid 1101 using finger pull 1301 once solenoid 1105 has released the lid. Once the user is finished with access to the bin under lid 1101, the user can simply push lid 1101 back to the closed position. Lever 1102 interacts with the angled top of blade 1104 to deflect blade 1104 downward to allow lever 1102 to pass. Once lever 1102 has passed blade 1104, blade 1104 can return to its normal upward position under the action of a spring (not visible in FIG. 13), locking lid 1101 in the closed position.

Solenoids 1105 are but one example of a type of actuator that may be used to control access to the compartments in drawer 107, and other kinds of actuators may be used. For example, magnetic actuators, motors with appropriate linkages, or other kinds of actuators.

Figure 14:
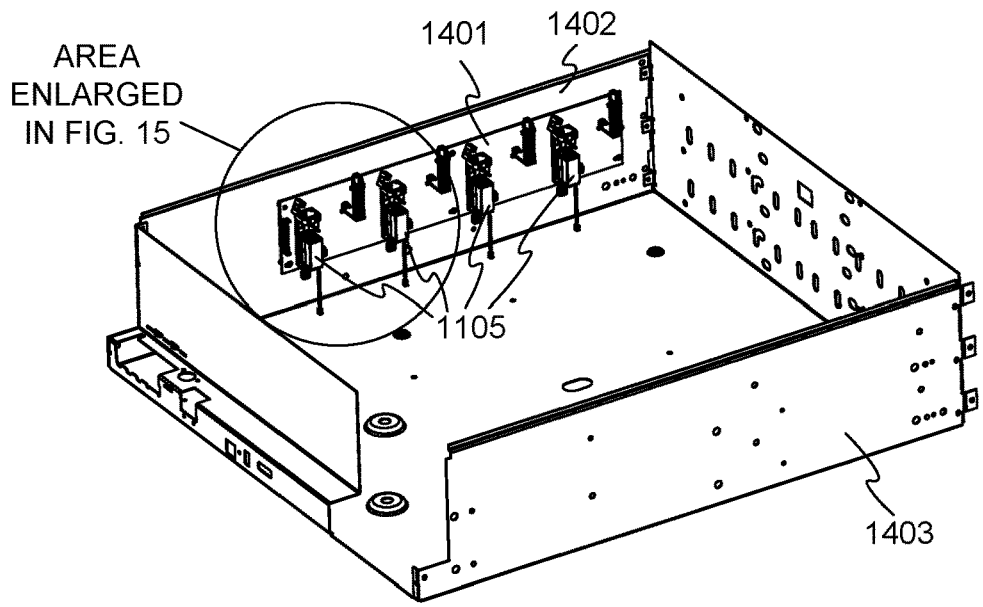
FIG. 14 shows an upper rear oblique view of the drawer of FIG. 3, with several components removed, in accordance with embodiments of the invention.
Figure 15:
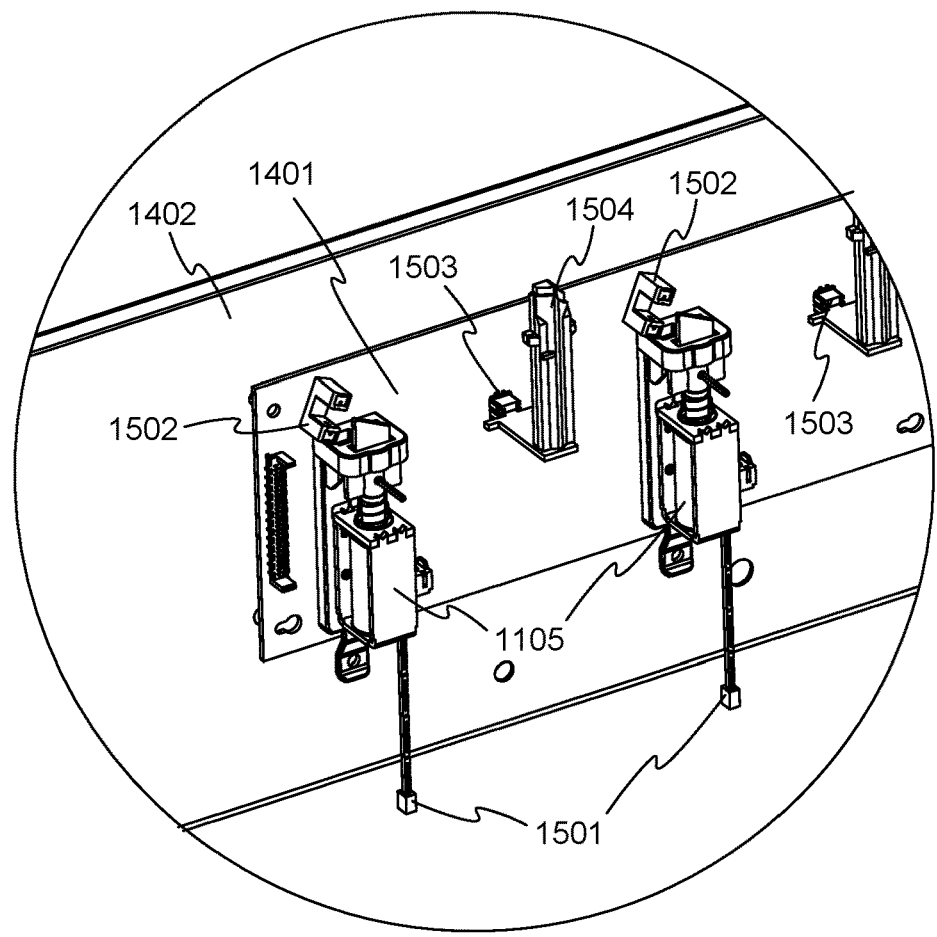
FIG. 15 shows an enlarged view of a portion of FIG. 14.

The architecture of drawer 107 may at least partially protect solenoid 1105 and its driving electronics from the cold environment within drawer 107. FIG. 14 shows an upper rear oblique view of drawer 107, with several components removed, and FIG. 15 shows an enlarged view of a portion of FIG. 14. A printed circuit board 1401 is mounted to side 1402 of drawer 107. A number of solenoids 1105 are mounted to circuit board 1401, and are connected via connectors 1501 to other circuitry (not shown) and eventually to controller 103. Similar components may be attached to the inner face of the other side 1403 of drawer 107 as well, but are not visible in FIG. 14.

A number of sensors 1502 may be provided, for providing positive feedback when the lever 1102 of one of lids 308 is in the closed position. Light emitting diodes (LEDs) 1503 may be present and also controllable by controller 103, for visually indicating the status of particular compartments through light pipes 1504, which extend to the top of drawer 107.

Figure 16:
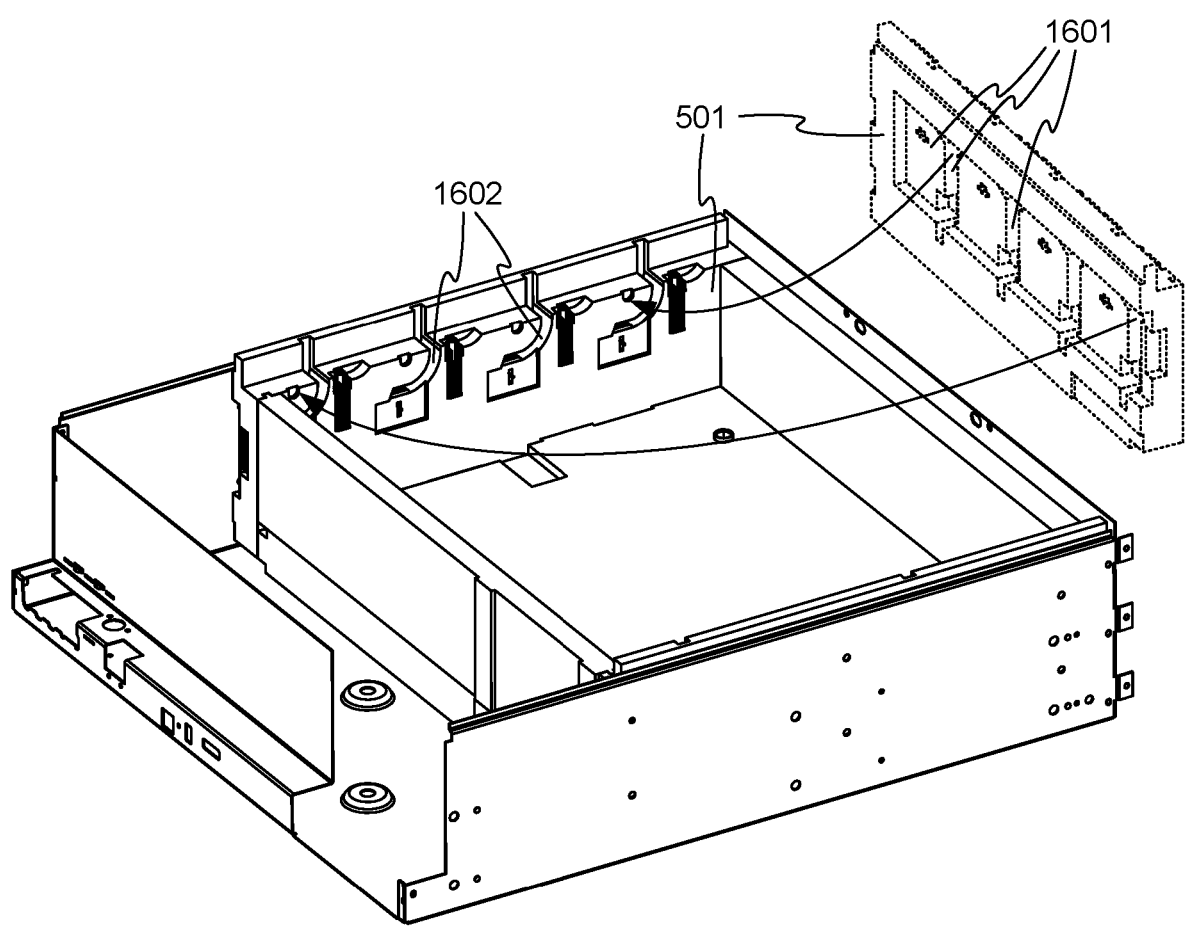
FIG. 16 illustrates the installation of an insulation panel in the drawer of FIG. 3, in accordance with embodiments of the invention.

With printed circuit board 1401 in place, including solenoids 1105, the insulation of drawer 107 can be put in place, as shown in FIG. 16. For example, side insulation panel 501 includes a number of recesses 1601 for accommodating printed circuit board 1401 and the components on it, including solenoids 1105. Once side insulation panel 501 is in place in drawer 107, printed circuit board 1401 and its associated components are positioned outside the refrigerated interior of drawer 107. Various slots 1602 in insulation panel 501 provide access to components on circuit board 1401, and are as small as possible so as to not compromise the insulating effect of insulation panel 501 more than necessary.

Figure 17:
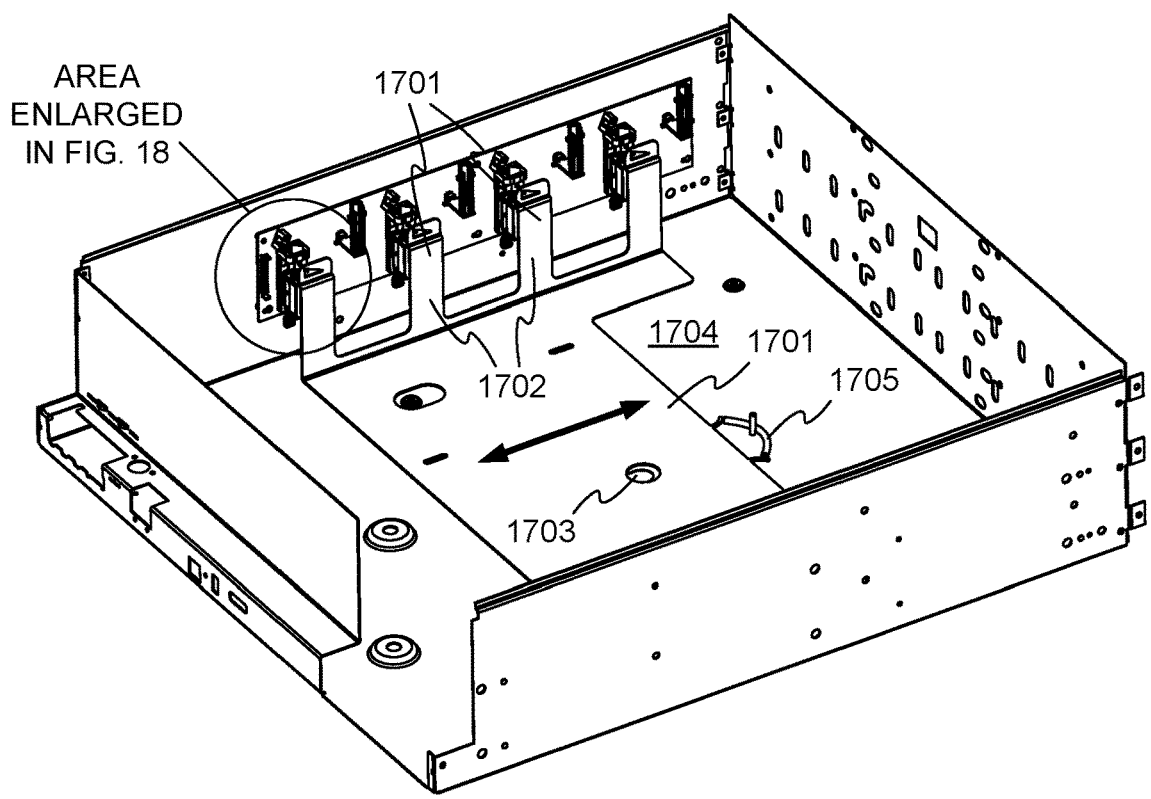
FIG. 17 illustrates an override mechanism in accordance with embodiments of the invention.
Figure 18:
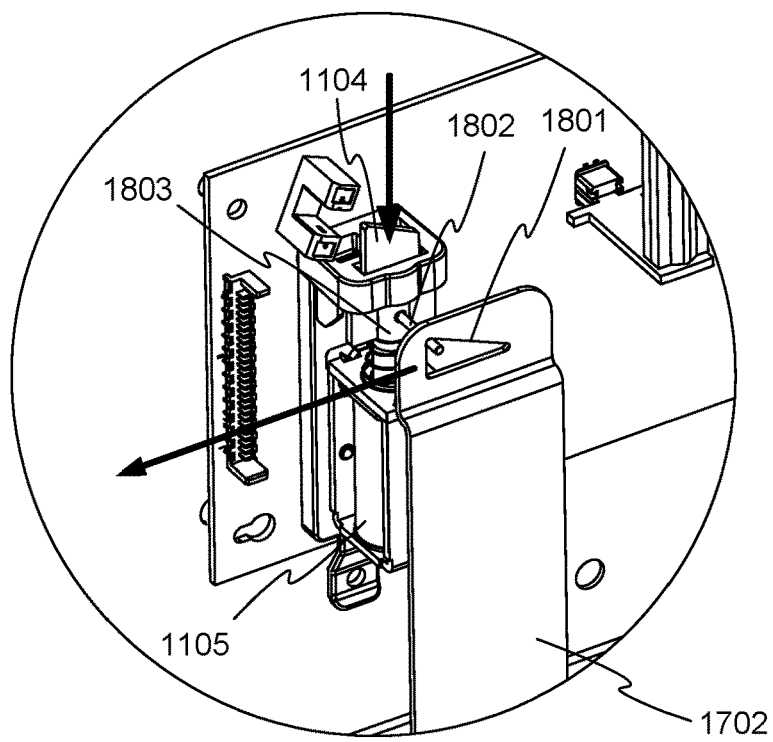
FIG. 18 shows a portion of FIG. 17 in more detail.

In some embodiments, a manual override mechanism is provided, for unlocking the compartments in drawer 107 manually, without reliance on controller 103. This capability may be useful, for example during a power outage or other occasion when controller 103 is not able to open the compartments. FIGS. 17 and 18 illustrate one example override mechanism. An override plate 1701 fits under the insulation (not shown) at the bottom of drawer 107, and includes risers 1702 at the sides of drawer 107 corresponding to solenoids 1105. Risers 1702 may extend inside the temperature-controlled interior of drawer 107, passing though slits in the lower insulation panel. Override plate 1701 may be accessible from the bottom of drawer 107. For example, a user may insert a finger through hole 1703 in bottom plate 1704 of drawer 107, to actuate override plate 1701 against a spring 1705.

As is best visible in FIG. 18, when override plate 1701 is actuated, a ramp feature 1801 in each riser 1702 interacts with a pin 1802 on the armature 1803 of the corresponding solenoid 1105, drawing armature 1803 and blade 1104 downward. With blade 1104 withdrawn, the corresponding lid is unlocked, as is described above and shown in FIG. 13.

It is to be understood that all workable combinations of the features disclosed herein are also considered to be disclosed.

The invention has now been described in detail for purposes of clarity and understanding. However, it will be appreciated that certain changes and modifications may be practiced within the scope of the appended claims.

What is claimed is:

1. A drawer configured for mounting in a cabinet, the drawer comprising:
   insulation defining an insulated interior of the drawer;
   an air inlet at a first side of the drawer;
   an air outlet at a second side of the drawer; and
   a fan;
   wherein the fan draws air into the air inlet and exhausts air out of the air outlet, and between the air inlet and the air outlet, the air flows through an air flow path in the drawer, the air flow path defined at least in part by the insulation.

2. The drawer of claim 1, further comprising a refrigeration system that cools the insulated interior of the drawer, wherein the fan causes air from outside the drawer to flow through a condenser of the refrigeration system.

3. The drawer of claim 2, wherein the refrigeration system comprises a compressor disposed at a back of the drawer, and an evaporator disposed within the insulated interior of the drawer.

4. The drawer of claim 1, wherein the first side of the drawer is a front of the drawer, and wherein the air inlet is hidden within a handle at the front of the drawer.

5. The drawer of claim 1, wherein the insulation comprises a top insulation panel that is slidable with respect to the rest of the drawer, to provide access to the insulated interior of the drawer.

6. The drawer of claim 1, wherein the flow path defined at least in part by the insulation is under the insulated interior of the drawer.

7. The drawer of claim 1, further comprising one or more dividers defining one or more compartments within the insulated interior of the drawer, at least some of the one or more compartments comprising lids.

8. The drawer of claim 7, further comprising one or more actuators coupled to the lids for locking and unlocking the one or more compartments.

9. The drawer of claim 8, wherein the one or more actuators comprise one or more solenoids mounted to one or more printed circuit boards, and disposed outside the insulated interior of the drawer.

10. The drawer of claim 9, wherein one of the lids comprises a lever, and one of the solenoids blocks rotation of the lever, preventing opening of the corresponding lid when the solenoid is not energized.

11. A drawer configured for mounting in a cabinet, the drawer comprising:
- insulation defining a climate-controlled interior of the drawer;
- a refrigeration system having a compressor and a condenser disposed within the drawer but outside the climate-controlled interior of the drawer, and having an evaporator disposed within the climate-controlled interior of the drawer;
- an air inlet at a first side of the drawer;
- an air outlet at a second side of the drawer; and
- a fan;
- wherein the fan draws air into the air inlet and exhausts air out of the air outlet, and between the air inlet and the air outlet, the air flows through an air flow path in the drawer, the air flow path defined at least in part by the insulation.

12. The drawer of claim 11, wherein the fan causes air from outside the drawer to flow through a condenser of the refrigeration system.

13. The drawer of claim 12, wherein the first side of the drawer is a front of the drawer, and wherein the air inlet is hidden within a handle at the front of the drawer.

\* \* \* \* \*